United States Patent [19]
Saito et al.

[11] Patent Number: 5,600,612
[45] Date of Patent: Feb. 4, 1997

[54] MAGNETOOPTIC RECORDING METHOD AND APPARATUS

[75] Inventors: Jun Saito, Tokyo; Shinichi Kurita, Kanagawa; Yoshihiro Yamanaka, Kanagawa; Kazutomo Miyata, Kanagawa, all of Japan

[73] Assignee: Nikon Corporation, Tokyo, Japan

[21] Appl. No.: 331,578

[22] PCT Filed: Mar. 15, 1994

[86] PCT No.: PCT/JP94/00411

§ 371 Date: Nov. 1, 1994

§ 102(e) Date: Nov. 1, 1994

[87] PCT Pub. No.: WO94/22139

PCT Pub. Date: Sep. 29, 1994

[30] Foreign Application Priority Data

Mar. 15, 1993 [JP] Japan ............................ 5-078515
Nov. 8, 1993 [JP] Japan ............................ 5-277946

[51] Int. Cl.$^6$ .......................... G11B 11/10; G11B 7/00
[52] U.S. Cl. ........................ 369/13; 369/100; 369/116
[58] Field of Search .......................... 369/13, 59, 116, 369/100, 44.26, 44.34; 360/59

[56] References Cited

U.S. PATENT DOCUMENTS

| | | | |
|---|---|---|---|
| 5,233,596 | 8/1993 | Tani | 369/116 |
| 5,297,128 | 3/1994 | Yamaguchi | 369/116 |
| 5,323,374 | 6/1994 | Arai | 369/116 |
| 5,329,512 | 7/1994 | Fukimoto | 369/116 X |

Primary Examiner—David C. Nelms
Assistant Examiner—Son Mai
Attorney, Agent, or Firm—Keck, Mahin & Cate

[57] ABSTRACT

In magnetooptic recording, compensation is provided for changes in temperature up and down characteristics for heating and cooling processes of a recording medium due to the rise and fall of a laser beam effected in dependence on the relative velocity of the laser beam and the recording medium. The advantages of the Z-CAV system, i.e., a high density recording and an enhanced access performance are realized and the reliability for performing a high density recording is also improved in the case of the CAV system. The relation between the relative velocity of the laser beam and the medium or the linear velocity of the medium and the thermal time constant of the medium is clarified and the thermal time constant τ at the current linear velocity is obtained. Information to be recorded is converted into binary signals and the laser beam intensity modulated in accordance with the binary signals is projected on the mangetooptic recording medium thereby recording the information. Thermal time constant information relating to the temperature variations of the magnetooptic recording medium due to the projection of the laser beam is preliminarily recorded on the magnetooptic recording medium. A clock frequency f is controlled in such a manner that a ratio T/τ between a reciprocal T of the clock frequency f and the thermal time constant τ of the medium is always maintained constant. The starting and end positions of each mark are formed with a high degree of accuracy.

7 Claims, 9 Drawing Sheets

MAGNETOOPTIC RECORDING METHOD AND APPARATUS

TECHNICAL FIELD

The present invention relates to a magnetooptic recording method, a magnetooptic recording medium and a magnetooptic recording apparatus.

BACKGROUND ART

While magnetooptic recording media capable of storing information with high densities are expected to come into wide use as large-capacity external memories, of these media an optical disc is attracting notice as an external memory for computers on the ground that it can effect the playback at a high speed. While there have been proposed various kinds of magnetooptic recording media which are different information storing method and size, in accordance with the ISO standards, the magnetooptic recording medium of the write-once type capable of writing information only once and the magnetooptic type capable of erasing the information have been standardized with respect to the size of 5.25 inches in diameter, whereas the ROM type and the magnetooptic type used exclusively for playback purposes as well as the partial ROM type featuring the coexistence of the magnetooptic type and the ROM type have been standardized with respect to the size of 3.5 inches in diameter, and these types are expected to be put on a still wider market in the future.

Also, recently the application of the optical disc has also been started in the field of digital audio. For instance, players have been put on the market in which the write-once type optical disc or magnetooptic disc is used as a master source in a digital multiple track recording of 24 to 48 tracks. In addition to these products adapted for use by the specialists, there has been the advant of products adapted for use by the general consumers, such as, a CD-R (a compact disc of the write-once type) and an MD (miniature disc) and their future trend attracts notice.

In these optical discs, the guides for orderly arranging the information marks by the laser beam from an optical pick-up of a recording and playback apparatus, i.e., the guides for tracking purposes are formed in the form of recessed or raised grooves spirally from the inner periphery toward the outer periphery of the disc. These grooves are called as guide grooves.

Explaining the guide grooves in greater detail, as defined according to the ISO standards, those portions constituting the recesser or the far portions as looked from the optical pick-up are called as lands and the other portions constituting the raised portions or the near portions as looked from the pick-up are called as grooves. Information is recorded on either the lands or the grooves. When recorded on the lands, it is called as a land recording system, whereas when recorded on the grooves, it is called as a groove recording system. The paths for recording the information are called as tracks, and the spacing between the center of one track and the center of the adjacent track is called as a track pitch.

Generally, each of the tracks is further divided into a plurality of portions which are called as sectors and each of the sectors is composed of an address part, a flag part, a data part and a buffer part. The address part indicates a physical address on the disc, the flag part indicates whether the sector is a recorded sector, defective sector, deleted sector or the like, the data part is a region for recording the desired information and the buffer part is provided as a buffer region for preventing the leading portion of the next sector from being recorded away even if a variation is caused in the rotation of the disc. The mark size of the data part is relatively small so as to record the information with a density which is as high as possible. Therefore, during recording it is necessary to effect the recording in synchronism with a certain frequency used as a reference and during playback it is necessary to effect the discrimination timing of playback signals in synchronism with the reference frequency; otherwise, there is the danger of failing to play back the desired recorded information due to any variations of the playback timing. The signals of this reference frequency are called as clock signals and the reference frequency is generally called as a clock frequency. A combination of these elements is referred to as a format.

Mainly, the below-mentioned formats are known.

(1) CLV system: Sectors of a given length are successively formed on spiral tracks from the inner side to the outer side and the rotational speed of a motor is controlled so as to obtain a rotational speed inversely proportional to the track radius thereby causing the linear velocity of the track to be recorded or played back (the relative velocity between the head and the disc) to become constant at any place on the disc. With this system, the clock frequency is constant and the recording laser beam intensity becomes the same at any position on the disc. Although the recording capacity is largest, there are disadvantages that the motor control is complicated and in this connection the access time is increased and so on.

(2) CAV system: This is a system in which the rotational speed of the motor (the disc) and the clock frequency are constant so that while the circuitry is simplified and the motor is also reduced in size, the recording capacity per track is dependent on the recordable minimum marksize along the innermost periphery of the disc recording area and therefore the overall recording capacity is smallest.

(3) Z-CAV system: This is one which incorporates the advantages of the above-mentioned two systems, that is, the large recording capacity of the CLV system and the easy motor control of the CAV system and it is so designed that with the motor (disc) rotational speed being constant, the disc recording area is divided into several zones and the clock frequency is fixed within each zone but closer the zones to the outer side higher is the clock frequency thereby increasing the recording capacity.

By virtue of this Z-CAV system, it is expected to make it possible to balance an increased recording density and an enhanced access performance at a high level.

However, the actual recording by the Z-CAV system is disadvantageous in that if, for example, an attempt is made to form marks of the same length at the same phases of the inner peripheral portion and the outer peripheral portion, the marks are caused to differ in position and length between the inner peripheral portion and the outer peripheral portion and this problem naturally causes deterioration of the discrimination quality of the signals recorded with a high density, thus causing failure to attain the essential aim of the Z-CAV system, i.e., the balancing of an increased recording density and an enhanced access performance at a high level. This phenomenon becomes more prominent relatively with increase in the recording density and it constitutes a serious obstacle for increase in the recording density. Also, the similar problem is caused, though in a less degree, in cases where the recording is effected by the CAV system.

With the Z-CAV system, the rotational speed of the disc is constant and thus the relative velocity of the laser beam and the medium or the linear velocity is varied depending on the recording position. In the Z-CAV system, generally the clock frequency is controlled so that it is in a substantially proportional relation with the linear velocity. On the other hand, while the temperature up and down characteristics for the heating and cooling processes of the medium due to the rise and fall of the laser beam also vary in dependence on the linear velocity, there is no proportional relation between the two. In other words, even if the clock frequency is controlled in proportion to the linear velocity, the temperature up and down characteristics do not vary in the same manner and therefore the manner of mark formation differs depending on the recording position.

While the fact that the temperature up and down characteristics for the heating and cooling processes of a medium due to the rise and fall of a laser beam vary in dependence on the relative velocity of the laser beam and the medium has been known as a phenomenon, the manner in which the two are related and the method of eliminating its effect have not been clarified.

DISCLOSURE OF INVENTION

It is an object of the present invention to study the relation between the two and devise a countermeasure thereby realizing the essential advantages of the Z-CAV system or an increased recording density and an enhanced access performance and enhancing the reliability in effecting a high density recording even in the case of the CAV system.

With a view to solving the problems, the inventors, etc., have earnestly made studies thus clarifying the relation between the relative velocity of the laser beam and the medium or the linear velocity of the medium and the thermal time constant of the medium and devising a method of obtaining a thermal time constant $\tau$ at this linear velocity. Also, it has been discovered that the starting and ending positions of a mark can be formed with a high degree of accuracy by controlling a clock frequency f so as to always maintain constant a ratio T/$\tau$ between a reciprocal T(=1/f) of the clock frequency f and the thermal time constant $\tau$ of the medium and the present invention has been made.

In accordance with the present invention, there is provided a magnetooptic recording medium on which information is recorded by the projection of a laser beam subjected to intensity modulation in accordance with binary signals corresponding to the information to be recorded, and this magnetooptic recording medium is characterized by the preliminarily recording on the magnetooptic recording medium of information of thermal time constants relating to temperature variations of the medium due to the projection of the laser beam.

Also, in accordance with the present invention there is provided a magnetooptic recording apparatus including an input unit for introducing binary signals representative of information to be recorded, a laser beam source, modulating means for modulating the output beam intensity of the laser beam source in accordance with the binary signals, a projection optical system for directing the beam from the laser beam source to a magnetooptic recording medium, and moving means for moving the magnetooptic recording medium relative to the beam, and this apparatus is characterized by including means for detecting the linear velocity of the magnetooptic recording medium relative to the beam, means for detecting the thermal time constant information preliminarily recorded on the magnetooptic recording medium and means responsive to the detected linear velocity and thermal time constant information to obtain a thermal time constant at the linear velocity by calculation.

Further, in accordance with the present invention there is provided a magnetooptic recording method including the steps of converting information to be converted into binary signals and projecting onto a medium a laser beam intensity modulated by the binary signals in synchronism with a clock frequency f serving as a reference frequency to record the information on the medium, and this method is characterized in that the clock frequency is controlled so as to maintain constant a ratio T/$\tau$ between a reciprocal T(=1/f) of the clock frequency f and the thermal time constant $\tau$ of the medium and in this condition the information is recorded on the medium.

Still further, in accordance with the present invention there is provided a magnetooptic recording medium whereby information to be recorded is recorded on the medium in response to the projection of a laser beam subjected to intensity modulation in accordance with binary signals corresponding to the information in synchronism with a clock frequency f serving as a reference frequency, and this magnetooptic recording medium is characterized by the preliminary recording on the medium of clock frequency information adapted to maintain constant a ratio T/$\tau$ between a reciprocal T(=1/f) of the clock frequency f and a thermal time constant $\tau$ of the medium.

Still further, in accordance with the present invention there is provided a magnetooptic recording apparatus including an input unit for introducing binary signals representative of information to be recorded, a laser beam source, modulating means for modulating the output beam intensity of the laser beam source in accordance with the binary signals in synchronism with a clock frequency f serving as a reference frequency, a projection optical system for directing the beam from the laser beam source to a magnetooptic recording medium, and moving means for moving the magnetooptic recording medium relative to the beam, and this apparatus is characterized by the inclusion of control means for maintaining constant a ratio T/$\tau$ between a reciprocal T(=1/f) of the clock frequency f and a thermal time constant $\tau$ of the medium.

In a magnetooptic recording method according to a preferred aspect of the present invention, the clock frequency f is controlled in a stepwise manner in accordance with the recording positions on the medium such that the ratio T/$\tau$ is made constant affinely.

In a magnetooptic recording medium according to another preferred aspect of the present invention, the information of the clock frequency f recorded on the medium includes information of the clock frequency varied in a stepwise manner in accordance with the recording positions on the medium so as to make constant the ratio T/$\tau$ affinely.

In a magnetooptic recording apparatus according to still another preferred aspect of the present invention, the control means performs a stepwise control so as to make constant the ratio T/$\tau$ affinely.

BEST MODE FOR CARRYING OUT THE INVENTION

Figure 3A:
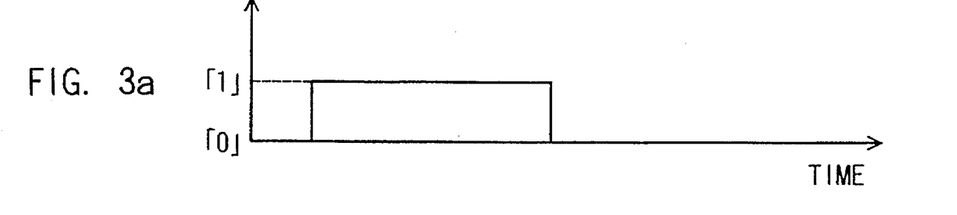
FIGS. 3a, 3b and 3c are graphs respectively showing a data signal to be recorded, a modulated waveform of a laser beam intensity corresponding to the data signal and the then current temperature profiles of a medium and recorded marks with the time base as the abscissa.
Figure 3B:
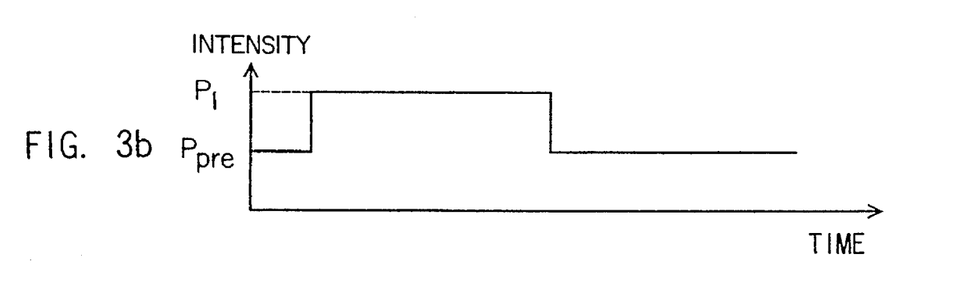
Figure 3C:
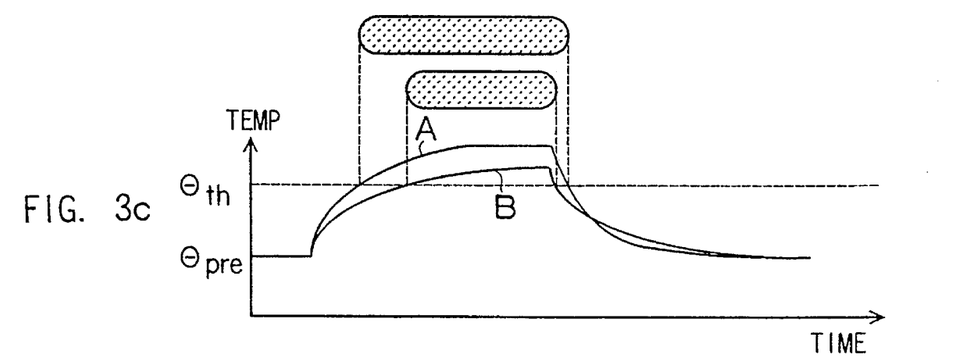

Before explaining a specific embodiment of a magnetooptic recording according to the present invention, a description will now be made of the fact that the starting and ending positions of a mark formed on a recording medium can be adjusted with a high degree of accuracy by controlling a clock frequency in accordance with the present invention such that the ratio T/τ between a reciprocal T(=1/f) of the clock frequency f and the thermal time constant τ of the recording medium is always maintained constant.

Where the recording is effected by projecting a laser beam on a magnetooptic recording medium, it is needless to say that the recording characteristic varies depending on the thermal diffusion of the medium. In other words, where the linear velocity is low, in a medium of a lower thermal diffusion the escape of heat to the surroundings is difficult as compared with a medium of a high thermal diffusion so that its temperature rise is faster and higher even if a laser beam of the same intensity is projected. More specifically, where a laser beam is projected with the same beam intensity for the same period of time, in the medium of the low thermal diffusion the temperature rise per unit intensity (°C./mW) is high and the temperature saturation level is high as compared with the case of the high thermal diffusion medium. This relation is shown in FIG. 3. FIG. 3a shows the variation with time of a binary coded information signal to be recorded when the same mark is to be recorded on the medium of the high thermal diffusion and the medium of the low thermal diffusion, FIG. 3b shows the variation with time of a laser beam intensity corresponding to the binary coded information, and FIG. 3c shows the time variations of the estimated temperature profiles of the recording media corresponding in time to FIG. 3b as well as the shapes of the marks formed correspondingly. It is to be noted that in FIG. 3c the curve A corresponds to the case where the thermal diffusion is relatively low and the curve B corresponds to the case where the thermal diffusion is relatively high; the mark shape is relatively long when the thermal diffusion is low and the mark shape is relatively short when the thermal diffusion is high.

Figure 4:
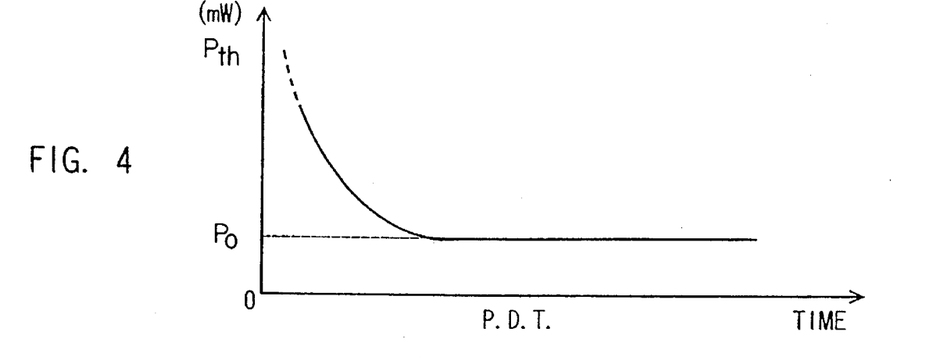
FIG. 4 is a graph showing the relation between P.D.T. and Pth.
Figure 5:
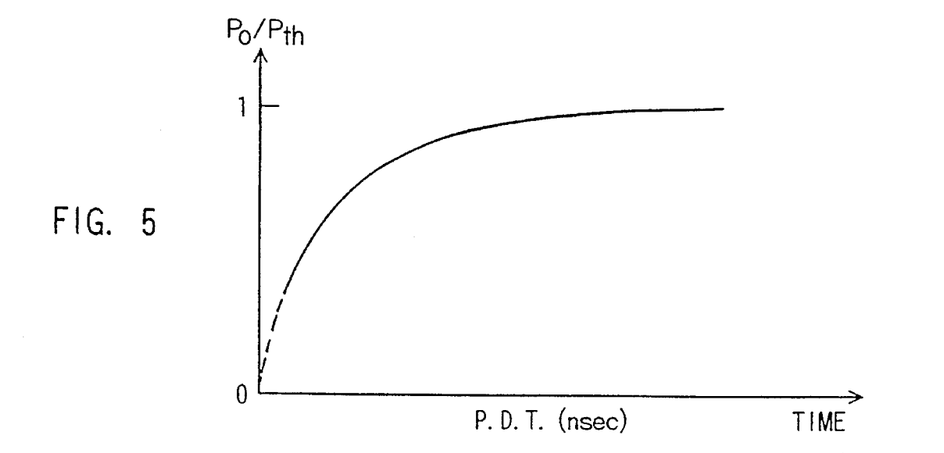
FIG. 5 is a graph showing the relation between P.D.T. and P0/Pth.
Figure 6:
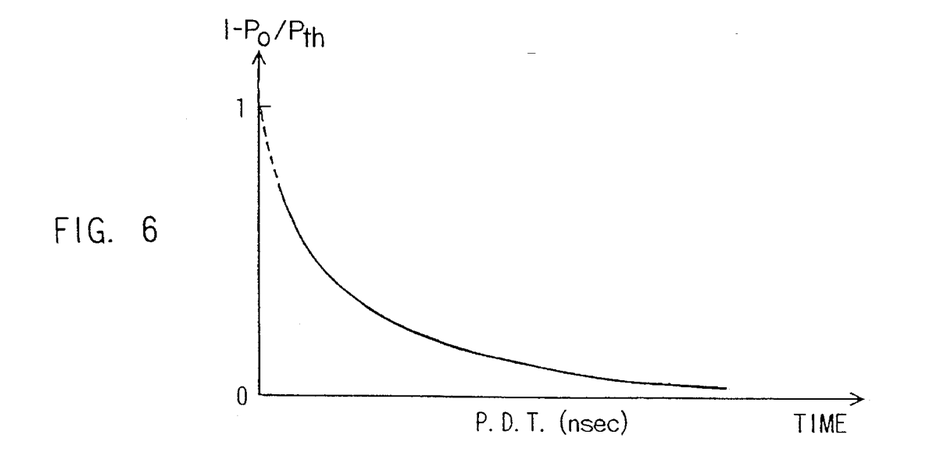
FIG. 6 is a graph showing the relation between P.D.T. and 1-P0/Pth.

The thermal time constant τ will now be explained. When projecting a laser beam modulated into the form of pulses onto a magnetooptic recording medium rotating at a constant velocity, the relation between the pulse duration time (hereinafter simply referred to as a P.D.T.) of the pulsed laser beam and the minimum power Pth capable of effecting the magnetooptic recording is considered to become as shown in FIG. 4. In other words, the value of Pth decreases with increase in the value of P.D.T. and it eventually converges to a certain level $P_o$. Thus, by representing the reciprocal of the value obtained by the normalization of Pth by $P_o$ or $P_o/Pth$ by the ordinate and representing the P.D.T. by the abscissa to show the relation between the two, we obtain the result as shown in FIG. 5 and this indicates a thermal response curve during the period of temperature rise in a magnetooptic recording medium when a laser beam is projected onto the medium. Simultaneously, if the $1-P_o/Pth$ is represented by the ordinate, the result becomes as shown in FIG. 6 and this indicates a thermal response curve during the period of temperature drop in the medium when the projection of the laser beam is stopped. If these thermal response curves can be approximated by an exponential function $\exp(-t/\tau)$ with t representing the elapsed time, it is said that τ represents the thermal time constant under the linear velocity V and the used optical system conditions of the magnetooptic recording medium. Thus, the thermal time constant τ is a characteristic value related to the easiness of temperature rise or temperature drop in the medium due to the projection of the laser beam and the thermal characteristics (the manner of warming up and the manner of cooling down) of the medium can be satisfactorily approximated by an $\exp(-t/\tau)$ with t representing the elapsed time, with the result that t/τ can be said to be a parameter which represents the thermal characteristics of the medium and this can be put in another way that T/τ is a parameter which best represents the thermal characteristics of the medium.

Then, while the fact that τ appears to be dependent on the linear velocity has been known as previously mentioned as "the fact that the temperature up and down characteristics for the heating and cooling processes of the medium due to the rise and fall of the laser beam vary in dependence on the relative velocity of the laser beam and the medium has been known as a phenomenon", and the inventors have lately made various experiments and discovered that this fact can be satisfactorily expressed by the following equation (1)

$$1/\tau = 1/\tau_o + V/L_o \qquad (1)$$

Figure 7:
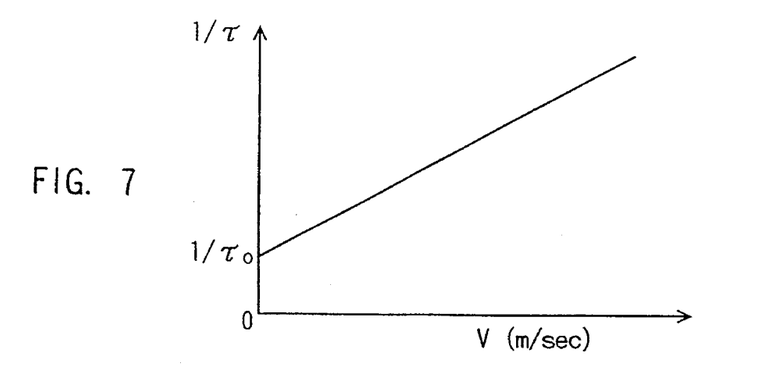
FIG. 7 is a graph showing the relation between the thermal time constant τ and the linear velocity V.

In other words, it has been found out that while the thermal time constant τ is a linear function of the linear velocity V, the two are not simply proportional to each other. This situation is shown in FIG. 7. Here, the segment $1/\tau_o$ of the ordinate gives a reciprocal of the thermal time constant when the medium is at rest. It is to be noted that $\tau_o$ and $L_o$ are constants obtained by experiments.

In the past, it has been the practice so that when the recording and playback are effected by the Z-CAV system, as for example, the linear velocity at the position of the radius of 60 mm is two times that at the position of the radius of 30 mm and the clock frequency is correspondingly doubled. In other words, the relation between the clock frequency f and the linear velocity V is given by the following equation (k is a proportional constant)

$$f=1/T=k * V \tag{2}$$

Figure 8:
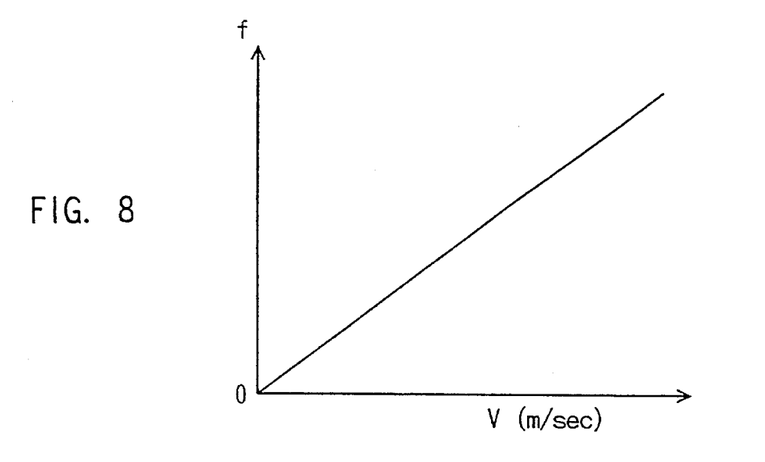
FIG. 8 is a graph showing the relation between the clock frequency f and the linear velocity V in the prior art.

This relation is shown in FIG. 8. Therefore, from equations (1) and (2) we obtain the following $$T/\tau \neq const.$$

This means that the thermal characteristics vary depending on the recording radial position.

Thus, the present invention proposes to give the clock frequency f as follows $$f=k * V+k * L_o/\tau_o \tag{3}$$

Figure 9:
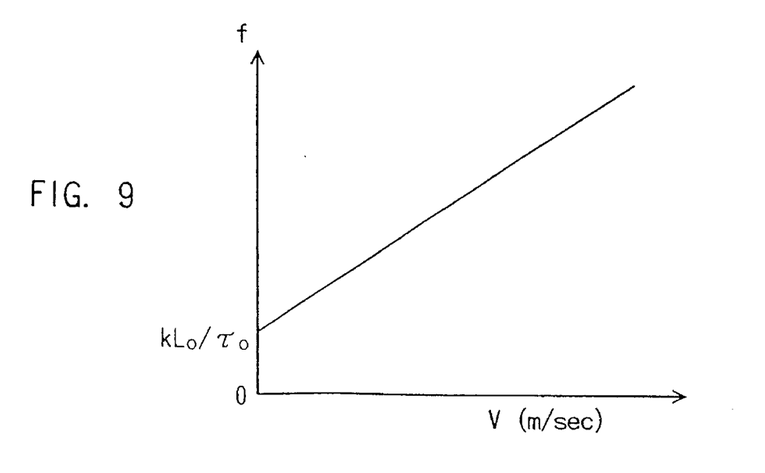
FIG. 9 is a graph showing the relation between the clock frequency f and the linear velocity V in a third embodiment of the present invention.

This is shown in FIG. 9. In this way, we can obtain the following from equations (1) and (3)

$$T/\tau=const.=1/(k * L_o)$$

and thus there is no longer the danger of the thermal characteristics of the medium varying depending on the recording radial position. Thus, it will be seen that the difference in signal discrimination performance due to the difference in recording radial position of the medium is eliminated and consequently the present invention provides a recording method more suited for the purpose of high density recording.

While some preferred embodiments of the present invention will now be described in greater detail, it is a matter of course that these embodiments are cited simply for the purpose of illustration and the present ivnention is not limited to these embodiments.

(Embodiment 1)

A magnetooptic disc having a diameter of 130 mm and formed with guide grooves with a pitch of 1.4 μm was prepared and the disc was rotated at 2400 rpm. Thermal time constants at several different linear velocities (several radial positions) were measured by the previously mentioned method and the values of $\tau_o$ and $L_o$ were obtained in accordance with equation (1). The values of $\tau_o$ and $L_o$ were recorded as thermal time constant information on the disc thus producing a magnetooptic recording medium.

It is to be noted that "thermal time constant information" to be recorded may be any information if it is capable of representing the relation between the linear velocity and the thermal time constant of the medium. Thus, a plurality of linear velocities and thermal time constants at these linear velocities may for example be recorded. Alternatively, the linear velocity at an arbitrary point, a thermal time constant at this linear velocity and the previously mentioned $L_o$ may be recorded.

(Embodiment 2)

Figure 1:
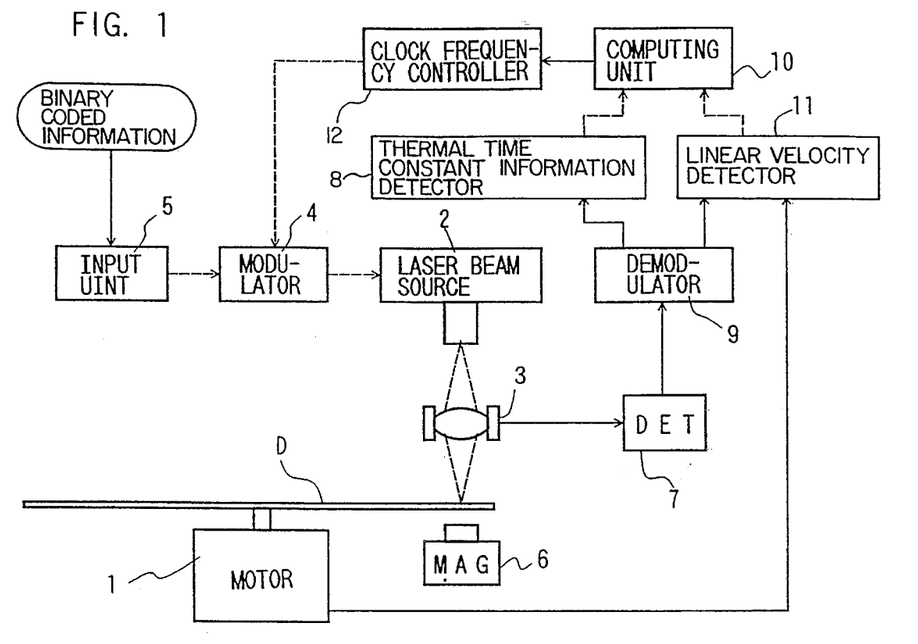
FIG. 1 is a block diagram for explaining the overall construction of a magnetooptic recording apparatus according to a second embodiment of the present invention.

This embodiment relates to a magnetooptic recording apparatus, and this apparatus mainly includes, as shown in FIG. 1, a motor 1 for rotating a magnetooptic recording medium D, a laser beam source 2 having a wavelength of 830 nm, a projection and playback optical system 3 having a numerical aperture (N.A.)=0.55, a modulator 4, an information input unit 5, a recording mangetic field application unit 6, a detector 7, a thermal time constant information detector 8, a medium linear velocity detector 11, a computing unit 10, a demodulator 9 and a clock frequency controller 12 thereby functioning as follows.

When a beam of a playback level intensity is projected from the laser beam source 2 through the projection and playback optical system 3 onto the magnetooptic recording medium D of the first embodiment on which the thermal time constant information has been preliminarily recorded, its reflected light is again passed through and converted into an intensity signal through the projection and playback optical system 3 and the signal is applied to the detector 7. The signal is converted into the form of current variations by the detector 7 and then applied to the demodulator 9 where the signal is demodulated into a code sequence representing the information. This information is outputted to and stored in the thermal time constant information detector 8.

On the other hand, the medium linear velocity detector 11 obtaines the linear velocity of the medium in accordance with the rotational speed of the motor 1 and the radial position at which the laser beam is projected. The rotational speed of the motor 1 can be detected by attaching an encoder or the like to the motor 1. The radial position at which the laser beam is projected can be recognized from the track number information in the information indicative code sequence generated by the demodulator 9.

In accordance with the information from the thermal time constant information detector 8 and the linear velocity detector 11, the computing unit 10 calculates the thermal time constant at the current linear velocity on the basis of equation (1).

The calculated thermal time constant can be utilized for various purpose. In accordance with the present embodiment, the calculated thermal time constant is used to control the clock frequency. The clock frequency controller 12 determines a clock frequency which results in T/τ=const. and this clock frequency information is outputted to the modulator 4.

Binary coded information to be recorded is supplied to the modulator 4 through the input unit 5 so that the modulator 4 modulates the intensity of the laser beam while varying the clock frequency track by track in accordance with the commands of the clock frequency controller 12 and the laser beam is projected on the magnetooptic recording medium through the projection optical system, thereby effecting the recording.

While, in the present embodiment, the calculated thermal time constant is utilized for the control of the clock frequency, it may be used for other purpose. For instance, use may be made such that during the period of recording the intensity of the laser beam to be projected on the magnetooptic recording medium is controlled in accordance with the value of the thermal time constant.

Also, while, in the present embodiment, the detection of the linear velocity of the medium is effected by detecting the rotational speed of the motor and the radial position at which the laser beam is projected, if the rotational speed of the motor is constant, the linear velocity can be obtained in accordance with only the radial position at which the laser beam is projected. In this case, the detection of the rotational speed of the motor is not required.

(Embodiment 3)

A magnetooptic disc having a diameter of 130 mm and formed with guide grooves with a pitch of 1.4 μm was prepared and the disc was rotated at 2400 rpm. Thermal time constants at several different linear velocities (several radial positions) were measured by the previously mentioned method and the relation between the linear velocity and the thermal time constant was obtained.

Then, in accordance with the thus obtained relation, a relation between the clock frequency and the linear velocity tending to result in T=40 nsec at the recording radius of 45 mm and T/τ=const. at any of the recording radii was obtained and this was recorded as clock frequency control information on this disc for the respective guide grooves, thereby producing a magnetooptic recording medium.

(Embodiment 4)

Figure 2:
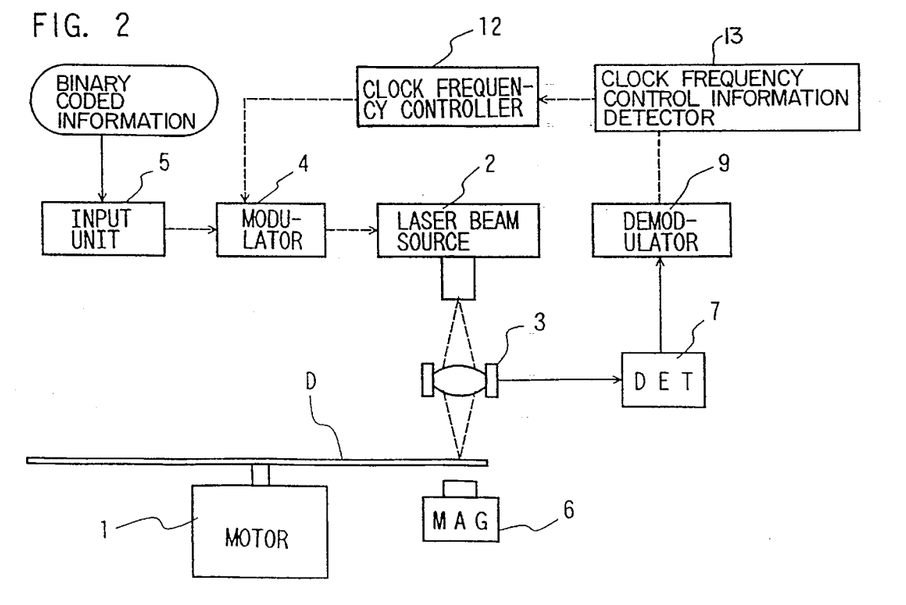
FIG. 2 is a block diagram for explaining the overall construction of a magnetooptic recording apparatus according to a fourth embodiment of the present invention.

A magnetooptic recording apparatus of this embodiment mainly includes, as shown in FIG. 2, a motor 1 for rotating a magnetooptic recording medium D, a laser beam source 2 having a wavelength of 830 nm, a projection and playback optical system 3 having a numerical aperture (N.A.)=0.55, a modulator 4, an information input unit 5, recording magnetic field application means 6, a detector 7, a clock frequency control information detector 13, a demodulator 9 and a clock frequency controller 12, and the apparatus functions as follows.

When a beam of a playback level intensity is projected from the laser beam source 2 through the projection and playback optical system 3 on the magnetooptic recording medium D of the third embodiment having the clock frequency information preliminarily recorded thereon, its reflected light is again passed through and converted into an intensity signal by the projection and playback optical system 3 and the signal is applied to the detector 7. After the signal has been converted into the form of current variations by the detector 7, it is outputted to the demodulating means 9 where the signal is demodulated to the information indicative code sequency. Of this information, at least the clock frequency control information is outputted to and stored in the clock frequency control information detector 13.

In accordance with the clock frequency control information, the clock frequency controller 12 calculates the clock frequency corresponding to the current linear velocity and outputs it to the modulator 4.

While the detection of the linear velocity can be effected in the like manner as the second embodiment, in accordance with the present embodiment the track number information is extracted from the information indicative code sequence demodulated by the demodulating means 9 and the desired linear velocity is obtained in accordance with this track number information and the predetermined rotational speed information of the motor 1.

The binary coded information to be recorded is applied to the modulator 4 through the input unit 5 so that while varying the clock frequency track by track as commanded by the clock frequency controller 12, the modulator 4 modulates the intensity of the laser beam in accordance with the input information and the laser beam is projected on the magnetooptic recording medium through the projection optical system thereby effecting the recording.

(Embodiment 5)

The present embodiment relates to a magnetooptic recording method.

Figure 10:
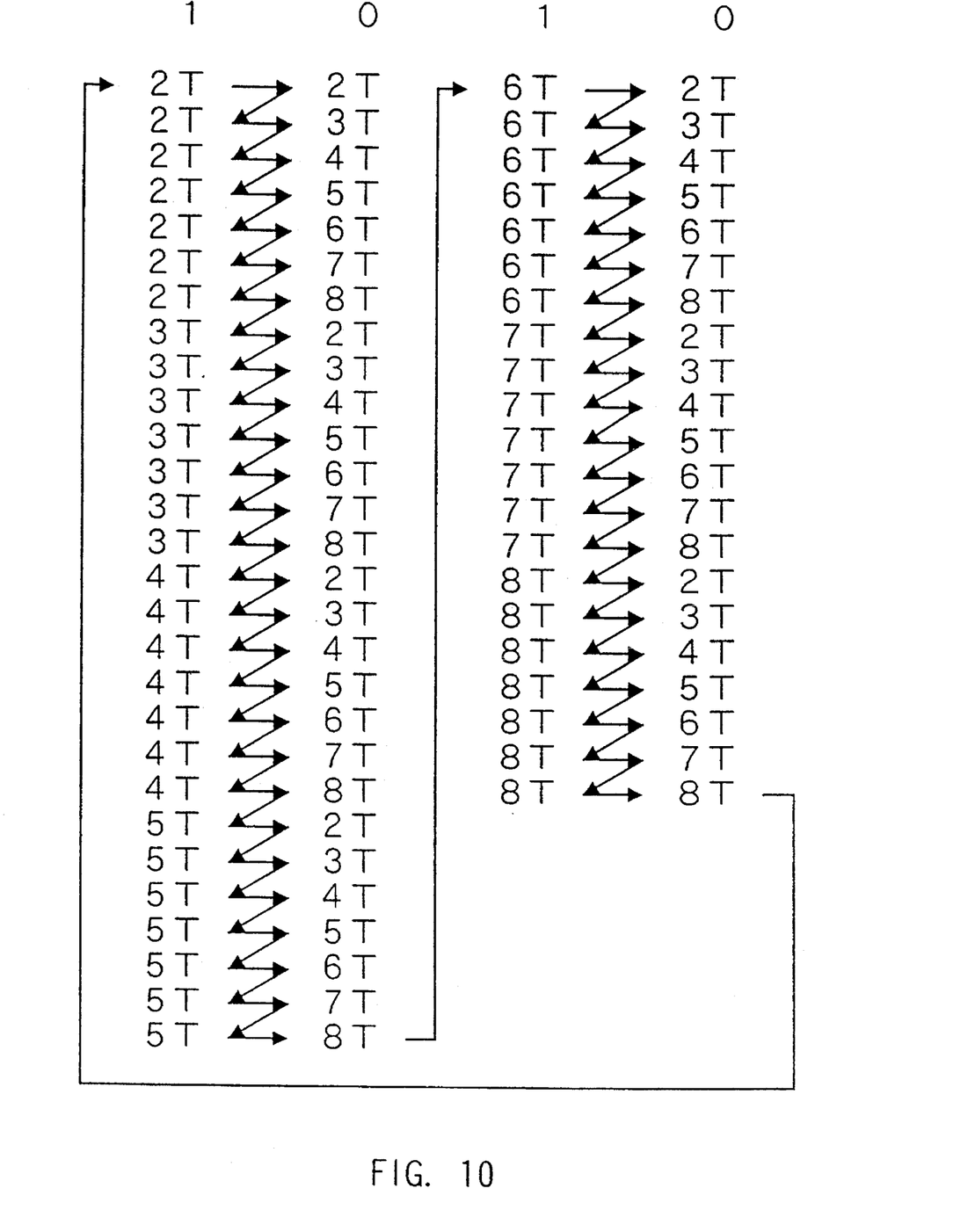
FIG. 10 is a schematic diagram for explaining the signals used in fifth and eighth embodiments of the present invention and a comparative example 1.
Figure 11A:
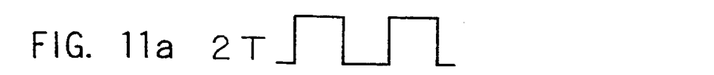
FIGS. 11a to 11g are diagrams for explaining 2T to 8T signal patterns.
Figure 11B:
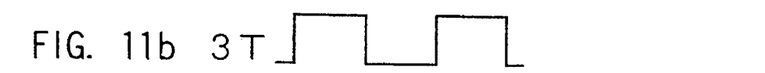
Figure 11C:
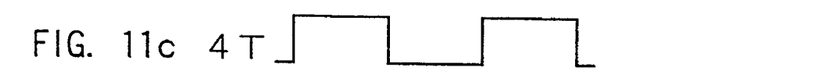
Figure 11D:
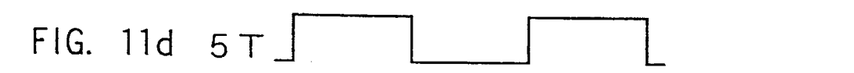
Figure 11E:
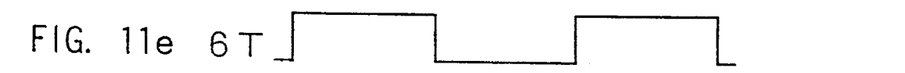
Figure 11F:
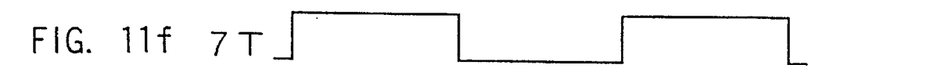
Figure 11G:
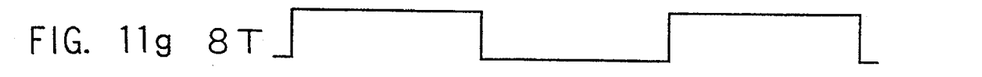
Figure 12:
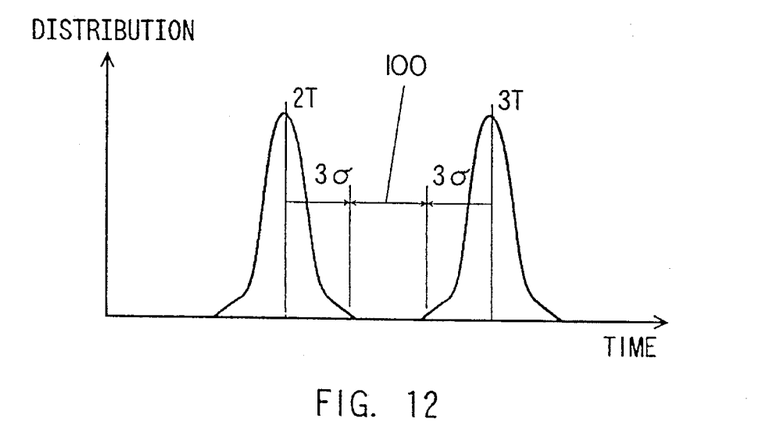
FIG. 12 is a diagram for explaining a window margin.

The recording apparatus of the fourth embodiment (FIG. 2) and the magnetooptic recording medium of the third embodiment were prepared. In the first place, the magnetooptic recording medium of the third embodiment was set in the recording apparatus of the fourth embodiment and mark length recording signals were prepared as recording signals by the NRZI recording of one seven modulation, RLL code and T (write clock period)=40 nsec. The resulting signals are shown in FIG. 10. In FIG. 10, nT (n is an integer) means that a reproduced signal of the recorded mark is n times the clock period T (e.g., two times in the case of 2T) (see FIGS. 11a to 11g). The above-mentioned signals were recorded while rotating the magnetooptic recording medium at 2400 rpm on the recording apparatus and varying the clock frequency track by track in accordance with the clock frequency control information. The recorded signals were respectively reproduced at the positions of the radii of 30, 40 and 60 mm and the signal discrimination quality (hereinafter referred to as a window margin) between 2T and 3T and 7T and 8T, respectively, were measured by a time interval analyzer. The results were shown in Table 1. The window margin between 2T and 3T means the time interval between the positions of 3 σ on the probability density curves of the 2T and 3T signals (see FIG. 12). In the case of the signals contiguous in signal length such as 2T and 3T, it would be relatively difficult to make discrimination therebetween. The signal discrimination qualities between 2T and 3T and 7T and 8T were measured as samples of the evaluations of the signal discrimination quality. Greater the resulting value, more excellent would be the data discrimination quality.

(Embodiment 6)

A magnetooptic disc having a diameter of 130 mm and formed with guide grooves of a 1.4 μm pitch was prepared and the disc was rotated at 2400 rpm. Thermal time constants at several different linear velocities (several radial positions) were measured by the previously mentioned method and the relation between the linear velocity and the thermal time constant was obtained.

Then, in accordance with the thus obtained relation such relation between the linear velocity and the thermal time constant which would result in T=40 nsec at the recording radius of 45 mm and also result in T/τ=const. at any recording radius was obtained: thereafter, the recording area was divided into seven parts and in each of the divided regions a given clock frequency tending to ensure T/τ=const., that is, T/τ would become constant affinely was recorded as clock frequency control information for the respective guide grooves on the disc, thus producing a magnetooptic recording medium.

(Embodiment 7)

A magnetooptic recording apparatus of this embodiment mainly includes, as shown in FIG. 2, a motor 1 for rotating a magnetooptic recording medium D, a laser beam source 2 having a wavelength of 830 nm, a projection and playback optical system 3 having a numerical aperture (N.A.)=0.55, a modulator 4, an information input unit 5, recording magnetic field application means 6, a detector 7, a clock frequency control information detector 13, a demodulator 9 and a clock frequency controller 12, and the apparatus functions as follows.

When a beam of a playback level intensity is projected from the laser beam source 2 through the projection and playback optical system 3 on the magnetooptic recording medium D of the sixth embodiment having the clock frequency information preliminarily recorded thereon, its reflected light is again passed through and converted into an intensity signal by the projection and playback optical system 3 and the signal is applied to the detector 7. After the conversion into the form of current variations by the detector 7, the signal is outputted to the demodulator 9 where it is demodulated to the information indicative code sequence. Of this information, at least the clock frequency control information is outputted to and stored in the clock frequency information detector 13.

In accordance with the clock frequency control information, the clock frequency controller 12 calculates the clock frequency corresponding to the current linear velocity and this information is outputted to the modulator 4.

While the detection of the linear velocity can be simply effected in the like manner as the second embodiment, in accordance with the present embodiment the track number information is extracted from the information indicative code sequence demodulated by the demodulator 9 and the linear velocity is obtained in accordance with this track number information and the predetermined rotational information of the motor 1.

Binary coded information to be recorded is applied to the modulator 4 through the input unit 5 so that while varying the clock frequency in a stepwise manner as commanded by the clock frequency controller 12, in accordance with the input information the modulator 4 modulates the intensity of the laser beam and the laser beam is projected on the magnetooptic recording medium through the prejection optical system, thereby effecting the recording.

(Embodiment 8)

The present embodiment relates to a magnetooptic recording method.

Figure 13:
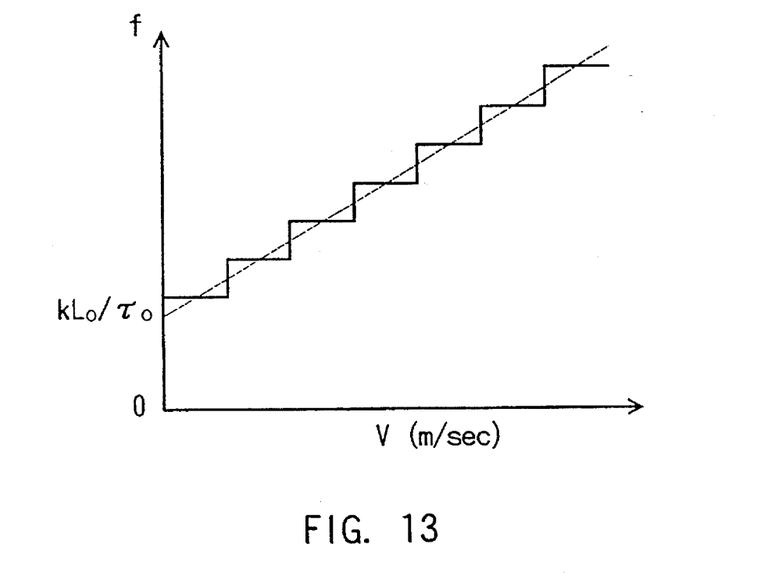
FIG. 13 is a graph showing the relation between the clock frequency f and the linear velocity V in a sixth embodiment of the present invention.

The recording apparatus (FIG. 2) of the seventh embodiment and the magnetooptic recording medium of the sixth embodiment were prepared. Firstly, the mangetooptic recording medium of the sixth embodiment was set in the recording apparatus of the seventh embodiment and the same signals as the fifth embodiment (see FIG. 10) were prepared as recording signals. The magnetooptic recording medium was rotated at 2400 rpm and the above-mentioned signals were recorded while continuously varying the clock frequency according to the clock frequency control information. The recorded signals were respectively reproduced at the positions of radii of 30, 45 and 60 mm and the signal discrimination quality (hereinafter referred to as a window margin) between 2T and 3T and 7T and 8T, respectively, were measured by a time interval analyzer. The results obtained are also shown in Table 1. Also, the clock frequency control pattern actually effected in this case is shown in FIG. 13.

(COMPARATIVE EXAMPLE 1)

In accordance with the same specification as the third embodiment, a magnetooptic recording medium having no clock frequency control information recorded thereon was set on the recording apparatus of the fourth embodiment. After setting such that the clock frequency would become the same as the clock frequency of the fifth embodiment at the radius of 45 mm, in the same manner as in the past, the similar signals were recorded while controlling the clock frequency so as to be in a proportional relation with the recording radii. Thereafter, the window margins were measured in all the same manner as mentioned previously. The results obtained are also shown in Table 1.

TABLE 1

|  |  | Recording radii | | |
|---|---|---|---|---|
|  |  | 30 mm | 45 mm | 60 mm |
| Embodiment 5 | 2T ⇆ 3T | 51.3 | 51.9 | 50.7 |
|  | 7T ⇆ 8T | 51.1 | 51.5 | 50.6 |
| Embodiment 8 | 2T ⇆ 3T | 50.4 | 52.0 | 50.2 |
|  | 7T ⇆ 8T | 50.1 | 51.4 | 50.0 |
| Comparative | 2T ⇆ 3T | 36.6 | 51.5 | 35.8 |
| example 1 | 7T ⇆ 8T | 35.9 | 51.3 | 35.0 |
|  |  |  |  | (dB) |

From Table 1 it will be seen that substantially the same window margin is obtained at the position of the recording radius of 45 mm in both of the fifth embodiment and the comparative example 1 and that at the positions of 30 mm and 60 mm the window margins show practically no variation as compared with the position of 45 mm in the case of the fifth embodiment, whereas the window margins are decreased extremely in the case of the comparative example 1. This is considered to be due to the fact that in accordance with the conventional control of the clock frequency there is caused the difference in the formation of marks between the inner peripheral side and the outer peripheral side. On the contrary, it is considered that in the case of the fifth embodiment the window margins show practically no variations due to the selection of the optimum clock frequencies tending to prevent variation in the formation of marks.

Also, in the case of the eighth embodiment the window margins at the positions of 30 mm and 60 mm vary less from those at the position of 45 mm, although not the same as in the case of the fifth embodiment. This proves that a satisfactory effect for the practical purposes can be obtained even by the method of varying the clock frequency in a stepwise manner so that T/τ≈const. results, that is, T/τ is made constant affinely.

As described hereinabove, in accordance with the present invention the formation of marks can be effected under the conditions which are very close to constancy irrespective of changes of the recording positions. As a result, the discrimination quality of the recorded information can be maintained at a high level at any position in the recording area and a high density recording is made possible which realizes the essential abilities of the Z-CAV system, i.e., a high recording density and an enhanced access performance.

Also, the clarification of the relation between the linear velocity and the thermal time constant produces the following advantages.

In other words, with the "mark length recording system" for representing information by the edge positions of marks, the following two methods have been proposed for the formation of each mark.

Figure 14:
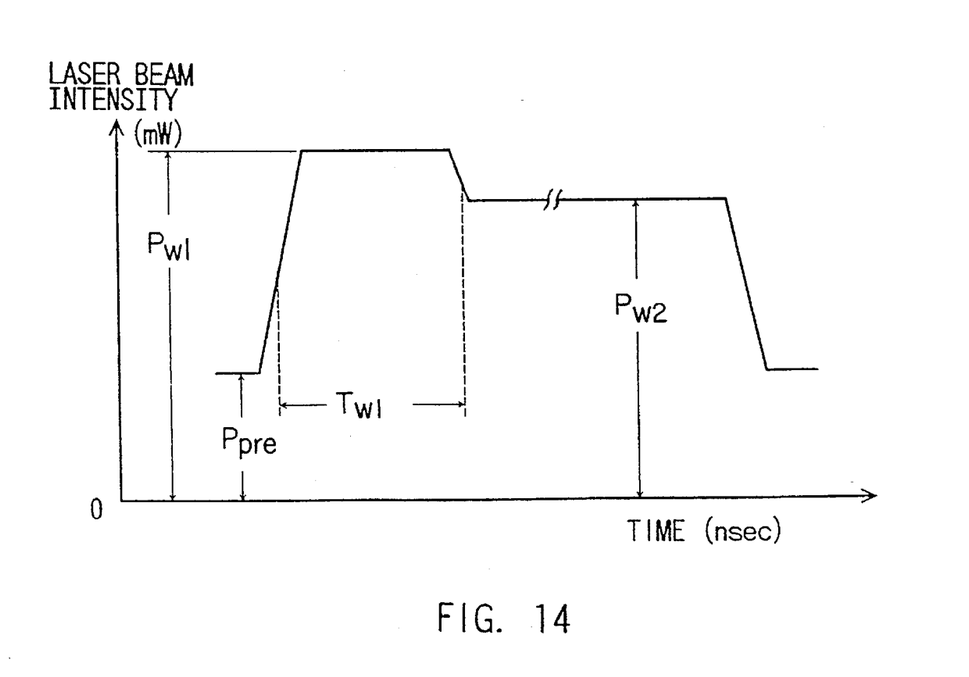
FIG. 14 is a laser beam intensity waveform diagram for the case of forming a single mark by a pre-pulse system.

The first method is one called as a pre-pulse system and, as shown in FIG. 14, a mark is formed by raising the intensity of a laser beam from a base intensity Ppre to an intensity Pw1 higher than Ppre, maintaining Pw1 over a time Tw1 in terms of a half-amplitude level, then dropping the beam intensity to an intensity Pw2 lower than Pw2, maintaining Pw2 for a given time and then dropping the beam intensity to Ppre or less to complete the formation of the mark.

Figure 15:
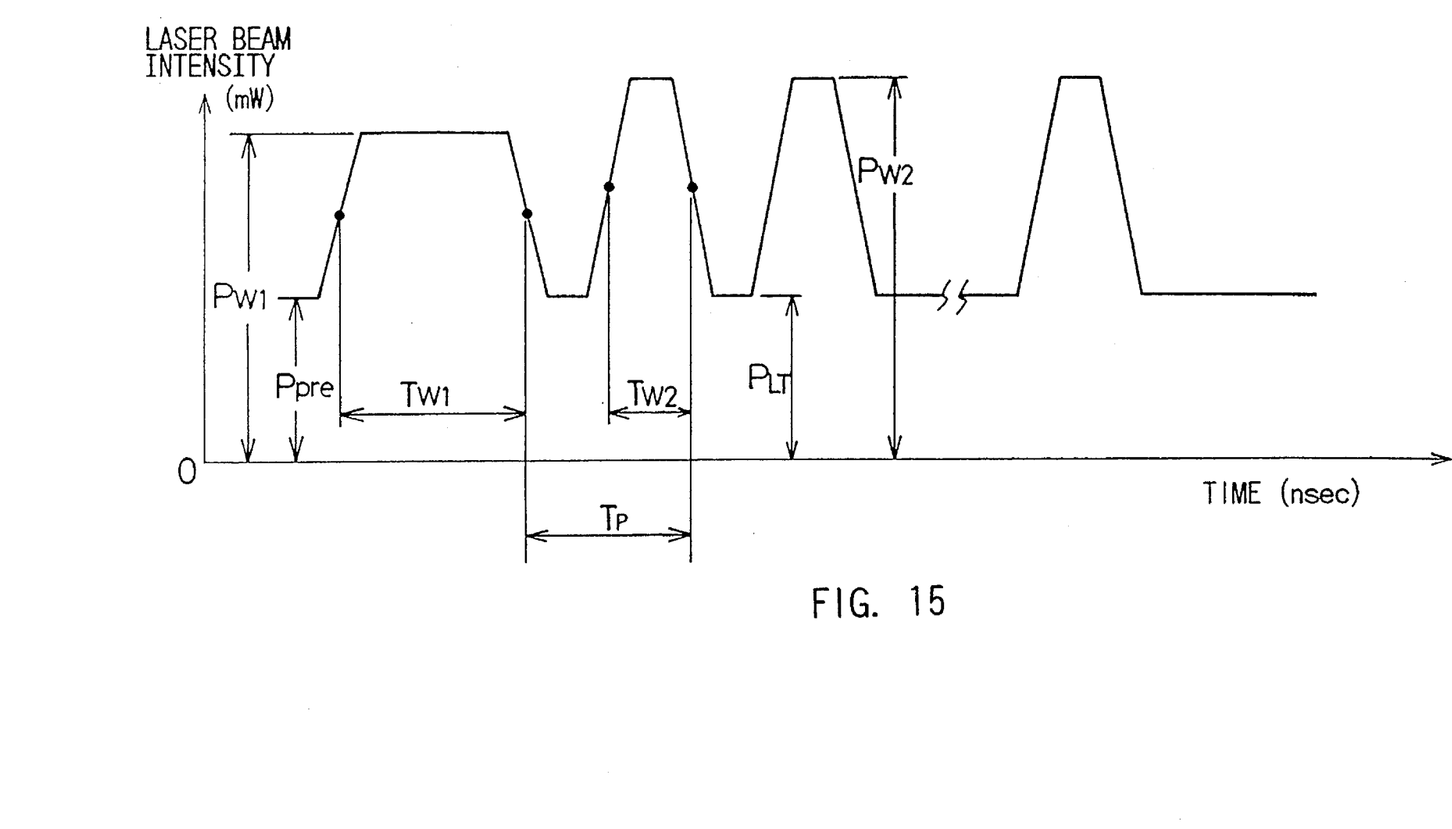
FIG. 15 is a laser beam intensity waveform diagram for the case of forming a single mark by a pulse train system.

The second method is one called as a pulse train system and, as shown in FIG. 15, a mark is formed by raising the intensity of a laser beam from a base intensity Ppre to Pw1 higher than Ppre, maintaining Pw1 for a time Tw1, then dropping the beam intensity to an intensity $P_{LT}$ lower than Pw1 and thereafter modulating the laser beam intensity during a time interval between $P_{LT}$ and an intensity Pw2 higher $P_{LT}$. In this case, Tw2 represents the time for maintaining the beam intensity Pw2 and Tp represents the modulation period for modulating the beam intensity between $P_{LT}$ and Pw2. In this system, the waveform which should essentially be composed of a single pulse, takes the form of a waveform composed of a leading small pulse and one or more following small pulses.

These systems solve the problem that "the end position of the mark formation, i.e., the rear edge position of a mark has dependence on the pattern of the recorded data".

Figure 16:
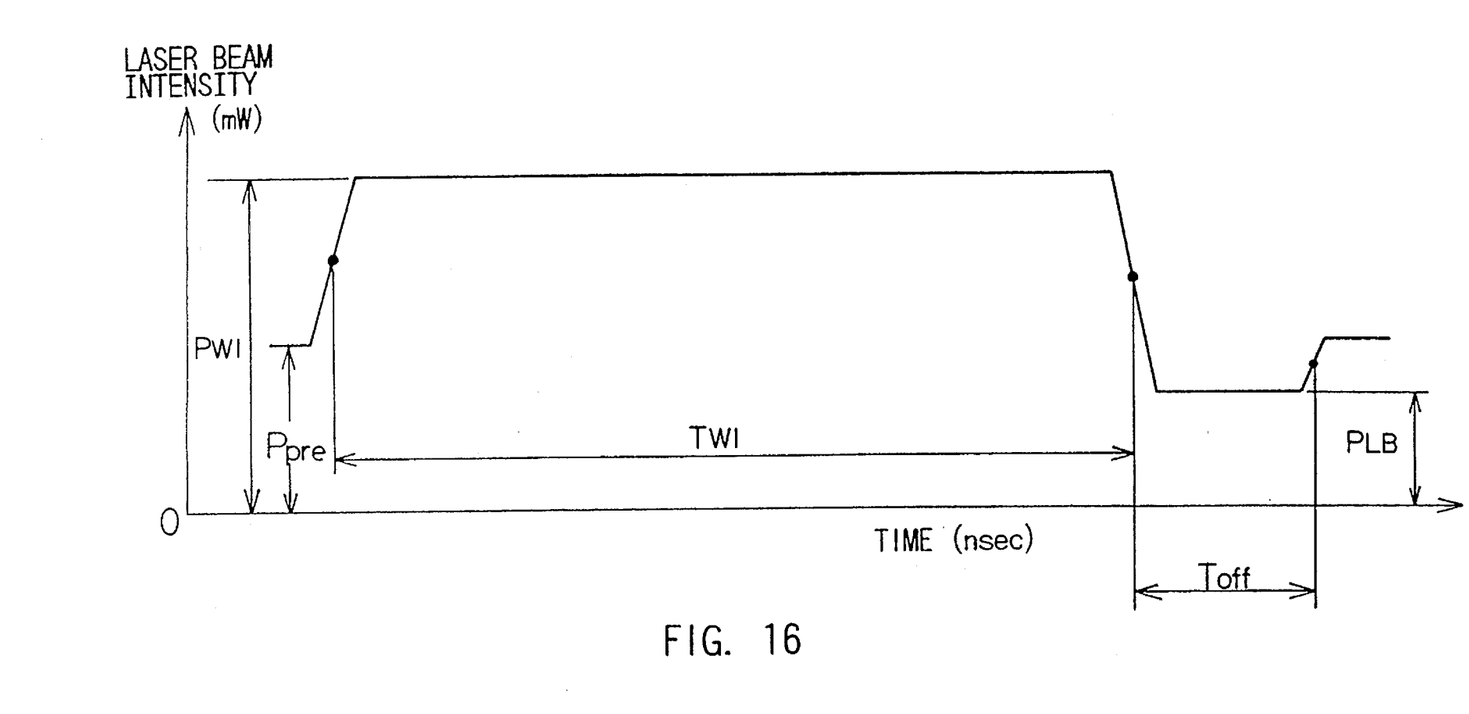
FIG. 16 is a laser beam intensity waveform diagram for the case of forming a single mark by a heat shielding system.

Also, with a view to solving the problem that "the starting position of the mark formation, i.e., the front edge position of a mark has dependence on the recorded data pattern", an optical recording system has been proposed in which, as shown in FIG. 16, when dropping the laser beam intensity to complete the mark formation, the beam intensity is temporarily dropped to $P_{LB}$ lower than the base intensity Ppre and the beam intensity is raised to Ppre after the lapse of a time Toff. This is called as a heat shielding system.

Generally, the pre-pulse system and the pulse train system are each used in combination with the heat shielding system.

In addition to the present application, the inventors, etc., have proposed a method for determining the optimum recording conditions of the pre-pulse system, the pulse train system and the heat shielding system. The following equations (4), (5) and (6) respectively show the optimum conditions for the pre-pulse system, the pulse train system and the heat shielding system.

$$Pw2-Ppre=(Pw1-Ppre) * \{1-exp(-Tw1/\tau)\} \tag{4}$$

$$(Pw1 - Ppre) * \{1 - exp(-Tw1/\tau)\} * \{1 - exp(-Tp/\tau)\} = \tag{5}$$

$$(P_{LT} - Ppre) * \{1 - exp(-Tp/\tau)\} +$$

$$(Pw2 - P_{LT}) * \{1 - exp(-Tw2/\tau)\}$$

$$Toff=\tau * \ln[\{(Pw1-P_{LB})-(Pw1-Ppre) * exp(-Tw1/\tau)\}/(Ppre-P_{LB})] \tag{6}$$

Owing to the clarification of the relation between the linear velocity and the thermal time constant by the present invention, the thermal time constant τ of the medium can be accurately obtained at any linear velocity (radial position). By substituting the value of τ into equations (4), (5) and (6), it is possible to easily obtain the optimum conditions and thereby to remarkably reduce "the dependence of the front edge position of a mark and the rear edge position of a mark on the recorded data pattern". If this dependence is reduced, a higher density recording can be effected accurately and the discrimination quality of data is improved.

We claim:

1. A magnetooptic recording apparatus comprising an input unit for introducing binary signals representing information to be recorded, a laser beam source, modulating means for modulating an output beam intensity of said laser beam source in accordance with said binary signals, a projection optical system for directing the beam from said laser beam source to a magnetooptic recording medium, and moving means for moving said magnetooptic recording medium relative to said beam, characterized by comprising:

means for detecting a linear velocity of said magnetooptic recording medium with respect to said beam, means for detecting thermal time constant information preliminarily recorded on said magnetooptic recording medium, and means responsive to said detected linear velocity and thermal time constant information to compute a thermal time constant at said linear velocity by calculation.

2. A magnetooptic recording method comprising the steps of converting information to be recorded into binary signals, and recording said information on a medium by projecting on said medium a laser beam intensity modulated by said binary signals in synchronism with a clock frequency f serving as a reference frequency, characterized by comprising the step of:

controlling said clock frequency f in such a manner that said information is recorded on said medium while maintaining constant a ratio T/τ between a reciprocal T(=1/f) of said clock freqency f and a thermal time constant τ of said medium.

3. A magnetooptic recording medium for recording information to be recorded by the projection of a laser beam subjected to intensity modulation in accordance with binary signals corresponding to said information in synchronism with a clock frequency f serving as a reference frequency, characterized in that clock frequency information adapted for making constant a ratio T/τ between a reciprocal T(=1/f) of said clock frequency f and a thermal time constant τ of said medium is preliminarily recorded on said medium.

4. A magnetooptic recording apparatus comprising an input unit for introducing binary signals representing information to be recorded, a laser beam source, modulating means for modulating an output beam intensity of said laser beam source in accordance with said binary signals in synchronism with a clock frequency f serving as a reference frequency, a projection optical system for directing the beam from said laser beam source to a magnetooptic recording medium, and moving means for moving said magnetooptic recording medium relative to said beam, characterized by comprising:

control means for controlling said clock frequency f so as to maintain constant a ratio T/τ between a reciprocal T(=1/f) of said clock frequency f and a thermal time constant τ of said medium.

5. A magnetooptic recording method as set forth in claim 2, characterized in that said clock frequency f is controlled in a stepwise manner in accordance with recording positions on said medium to make constant said ratio T/τ affinely.

6. A magnetooptic recording medium as set forth in claim 3, characterized in that said clock frequency information recorded on said medium includes clock frequency information varied in a stepwise manner in accordance with recording positions on said medium so as to make said ratio T/τ constant affinely.

7. A magnetooptic recording apparatus as set forth in claim 4, characterized in that said control means controls in a stepwise manner in accordance with recording positions on said medium so as to make said ratio T/τ constant affinely.

* * * * *